(12) United States Patent
Nakanishi (10) Patent No.: US 12,111,704 B2
(45) Date of Patent: Oct. 8, 2024

(54) FORCE SENSOR AND DISPLAY DEVICE

(71) Applicant: Japan Display Inc., Tokyo (JP)

(72) Inventor: Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 219 days.

(21) Appl. No.: 17/351,630

(22) Filed: Jun. 18, 2021

(65) Prior Publication Data

US 2021/0311534 A1 Oct. 7, 2021

Related U.S. Application Data

(63) Continuation of application No. PCT/JP2019/034665, filed on Sep. 3, 2019.

(30) Foreign Application Priority Data

Dec. 27, 2018 (JP) ................................. 2018-245957

(51) Int. Cl.
*G06F 3/044* (2006.01)
*G06F 1/18* (2006.01)
*G01L 1/14* (2006.01)
*G06F 3/041* (2006.01)

(52) U.S. Cl.
CPC .............. *G06F 1/182* (2013.01); *G06F 3/044* (2013.01); *G01L 1/144* (2013.01); *G06F 3/0414* (2013.01); *G06F 3/0445* (2019.05)

(58) Field of Classification Search
CPC ...... G06F 3/044; G06F 3/0414; G06F 3/0445; G06F 2203/04105
See application file for complete search history.

(56) References Cited

U.S. PATENT DOCUMENTS

| | | | |
|---|---|---|---|
| 2011/0057904 A1 | 3/2011 | Yamano | |
| 2016/0026318 A1 | 1/2016 | Yamano | |
| 2016/0342257 A1 | 11/2016 | Watazu et al. | |
| 2017/0160854 A1* | 6/2017 | Huang | G06F 3/0447 |
| 2018/0052557 A1 | 2/2018 | Yamano | |

(Continued)

FOREIGN PATENT DOCUMENTS

| | | | | |
|---|---|---|---|---|
| CN | 107290082 A | * | 10/2017 | ............ G01L 1/14 |
| JP | 2011-059822 A | | 3/2011 | |

(Continued)

OTHER PUBLICATIONS

International Search Report issued in International Patent Application No. PCT/JP2019/034665 on Oct. 1, 2019 and English translation of same. 5 pages.

(Continued)

*Primary Examiner* — Yuzhen Shen (74) *Attorney, Agent, or Firm* — K&L Gates LLP (57) ABSTRACT

According to an aspect, a force sensor includes: a first electrode; a second electrode; a first conductor facing the first electrode in a first direction; a second conductor facing the second electrode in the first direction; a first elastic member and a second elastic member arranged between the first electrode and the first conductor; and the first elastic member arranged between the second electrode and the second conductor. The first elastic member and the second elastic member have degrees of compression with respect to force thereon that are different depending on temperature.

11 Claims, 7 Drawing Sheets

(56) References Cited

U.S. PATENT DOCUMENTS

2018/0232096 A1\* 8/2018 Cheng ................... G06F 3/044
2019/0234814 A1\* 8/2019 Yoon ....................... H01B 3/30

FOREIGN PATENT DOCUMENTS

| | | | |
|---|---|---|---|
| JP | 2015-170178 A | 9/2015 | |
| JP | 2017-203691 A | 11/2017 | |
| JP | 6693260 B2 \* | 5/2020 | ............... G01L 1/14 |
| KR | 10-2014-001568 A | 2/2017 | |
| KR | 10-2017-0015681 A | 2/2017 | |
| WO | WO2013/065494 | 5/2013 | |
| WO | WO-2017215176 A1 \* | 12/2017 | ............. G06F 3/041 |

OTHER PUBLICATIONS

Written Opinion issued in International Patent Application No. PCT/JP2019/034665 on Oct. 1, 2019. 4 pages.

\* cited by examiner

FORCE SENSOR AND DISPLAY DEVICE

CROSS-REFERENCE TO RELATED APPLICATION

This application claims the benefit of priority from Japanese Patent Application No. 2018-245957 filed on Dec. 27, 2018 and International Patent Application No. PCT/JP2019/034665 filed on Sep. 3, 2019, the entire contents of which are incorporated herein by reference.

BACKGROUND

1. Technical Field

What is disclosed herein relates to a force sensor and a display device.

2. Description of the Related Art

Force sensors that detect force applied onto a panel have been known (for example, International Publication No. 2013/065494 (WO 2013/065494)).

A relation between force applied to the force sensor and an output signal of the force sensor can vary depending on the temperature of the force sensor. Thus, the configuration in WO 2013/065494 that does not take the temperature into consideration has had difficulty in enhancing detection accuracy of the force.

For the foregoing reasons, there is a need for a force sensor and a display device capable of detecting force with higher accuracy.

SUMMARY

According to an aspect, a force sensor includes: a first electrode; a second electrode; a first conductor facing the first electrode in a first direction; a second conductor facing the second electrode in the first direction; a first elastic member and a second elastic member arranged between the first electrode and the first conductor; and the first elastic member arranged between the second electrode and the second conductor. The first elastic member and the second elastic member have degrees of compression with respect to force thereon that are different depending on temperature.

According to an aspect, a force sensor includes: a first electrode; a second electrode; a conductor facing the first electrode and the second electrode in a first direction; a first elastic member arranged between the second electrode and the conductor; and a second elastic member arranged between the first electrode and the conductor. The first elastic member and the second elastic member have degrees of compression with respect to force thereon that are different depending on temperature. The first elastic member and the second elastic member are stacked in the first direction with the conductor interposed between the first elastic member and the second elastic member.

According to an aspect, a display device includes: the force sensor described above; and a display panel configured to display an image.

DETAILED DESCRIPTION

Hereinafter, embodiments will be described with reference to the drawings. What is disclosed herein is merely an example, and it is needless to say that appropriate modifications within the gist of the disclosure at which those skilled in the art can easily arrive are encompassed in the range of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference signs denote components identical to those described before with reference to the drawing that has already been referred, and detail explanation thereof can be appropriately omitted.

First Embodiment

Figure 1:
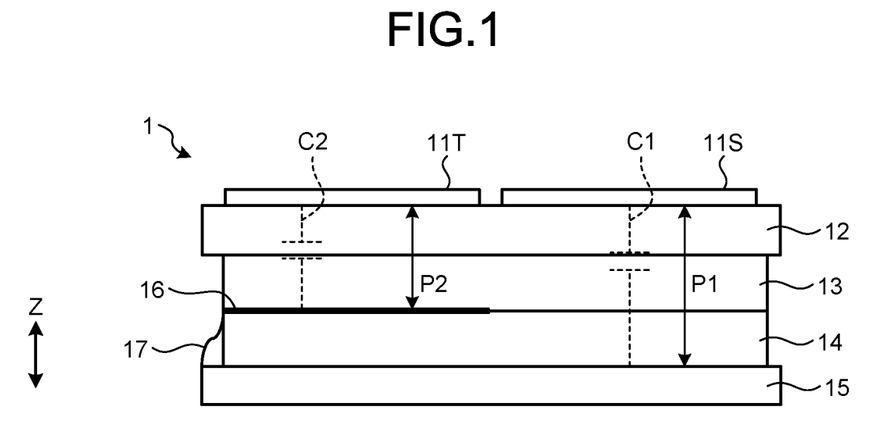
FIG. 1 is a diagram illustrating the main configuration of a force sensor according to a first embodiment.

FIG. 1 is a diagram illustrating the main configuration of a force sensor 1 according to a first embodiment. The force sensor 1 includes a first electrode 11S, a second electrode 11T, an insulator 12, a first elastic member 13, a second elastic member 14, a first conductor 15, a second conductor 16, and a coupling line 17.

The first electrode 11S and the second electrode 11T are plate-like or film-like electrodes. The insulator 12 is a plate-like insulator on which the first electrode 11S and the second electrode 11T are provided on one surface side. The insulator 12 is, for example, a glass plate but may be a plate made of resin, or the like. The first elastic member 13 and the second elastic member 14 are elastic members provided between the insulator 12 and the first conductor 15. The first conductor 15 is a plate-like conductor. The first conductor 15 is made of, for example, a metal such as aluminum, an alloy, or a compound.

The insulator 12, the first elastic member 13, the second elastic member 14, and the first conductor 15 form a multilayered structure. The second elastic member 14 is provided on one surface side of the first conductor 15. The first elastic member 13 is provided on one surface side of the second elastic member 14. The insulator 12 is provided on one surface side of the first elastic member 13. The first electrode 11S and the second electrode 11T are provided on one surface side of the insulator 12. Hereinafter, the stacking direction of the insulator 12, the first elastic member 13, the second elastic member 14, and the first conductor 15 is referred to as a Z direction or a first direction.

The second conductor 16 is interposed between the first elastic member 13 and the second elastic member 14. The second conductor 16 is a film-like or plate-like conductor. The second conductor 16 in the first embodiment is a metal film but may be made of a thin plate-like metal, an alloy, or a compound having such thickness that it forms no gap between the first elastic member 13 and the second elastic member 14. The second conductor 16 is provided at a position facing the second electrode 11T in the Z direction. The second conductor 16 does not face the first electrode 11S in the Z direction. Arrangement positions of the first elastic member 13 and the second elastic member 14 may be reversed. That is to say, the second elastic member 14 may be arranged between the second electrode 11T and the second conductor 16.

The second conductor 16 is electrically coupled to the first conductor 15 through the coupling line 17. The coupling line 17 is a conductive line that electrically couples the first conductor 15 and the second conductor 16 to make potentials of the first conductor 15 and the second conductor 16 equal to each other.

The first electrode 11S is an electrode, and the first conductor 15 is a conductor. Capacitance C1 is therefore generated between the first electrode 11S and the first conductor 15. The second electrode 11T is an electrode, and the second conductor 16 is a conductor. Capacitance C2 is therefore generated between the second electrode 11T and the second conductor 16.

The insulator 12, the first elastic member 13, and the second elastic member 14 are arranged between the first electrode 11S and the first conductor 15. A distance P1 between the first electrode 11S and the first conductor 15 in the Z direction therefore depends on the thicknesses of the insulator 12, the first elastic member 13, and the second elastic member 14 in the Z direction. The magnitude of the capacitance C1 illustrated in FIG. 1 depends on the distance P1. The insulator 12 and the first elastic member 13 are arranged between the second electrode 11T and the second conductor 16. A distance P2 between the second electrode 11T and the second conductor 16 in the Z direction therefore depends on the thicknesses of the insulator 12 and the first elastic member 13 in the Z direction. The magnitude of the capacitance C2 illustrated in FIG. 1 depends on the distance P2.

FIG. 1 illustrates the force sensor 1 in a state of receiving no external force. When the force sensor 1 receives force acting to compress it in the Z direction, at least one of the first elastic member 13 and the second elastic member 14 is compressed and deformed so as to reduce the thickness thereof in the Z direction. The first elastic member 13 and the second elastic member 14 thus function like cushions. When no force is applied thereto, the first elastic member 13 and the second elastic member 14 are restored into states before compression.

The first elastic member 13 and the second elastic member 14 have different temperature characteristics. The temperature characteristic of the first elastic member 13 is such a characteristic that the degree of compression of the first elastic member 13 with respect to a constant force varies depending on the temperature of the first elastic member 13. The temperature characteristic of the second elastic member 14 is such a characteristic that the degree of compression of the second elastic member 14 with respect to a constant force varies depending on the temperature of the second elastic member 14. Change in the temperatures of the first elastic member 13 and the second elastic member 14 can therefore change the relation between the compression degree of the first elastic member 13 and the compression degree of the second elastic member 14 even when the force applied to the force sensor 1 in the Z direction is constant.

The first elastic member 13 in the first embodiment and the second elastic member 14 in the first embodiment have substantially equal elasticity or do not have much difference in elasticity at a first temperature (for example, 25° C.). The first elastic member 13 and the second elastic member 14 are therefore compressed when the force sensor 1 receives force acting to compress it in the Z direction under the condition of the first temperature. On the other hand, at a second temperature (for example, −20° C.) lower than the first temperature, the first elastic member 13 in the first embodiment has a greater increase in rigidity and a greater decrease in elasticity than those of the second elastic member 14 in the first embodiment. By contrast, the second elastic member 14 in the first embodiment exhibits, even at the lower temperature, substantially the same compression degree as that at a normal temperature. Thus, the second elastic member 14 is compressed and the first elastic member 13 is hardly compressed when the force sensor 1 receives force acting to compress it in the Z direction under the condition of the lower temperature.

The first elastic member 13 in the first embodiment and the second elastic member 14 in the first embodiment are formed of, for example, porous synthetic rubber. Difference in the temperature characteristic between the first elastic member 13 and the second elastic member 14 is generated due to difference between the size, number, and distribution degree of pores contained in the first elastic member 13, and the size, number, and distribution degree of pores contained in the second elastic member 14. A material of the first elastic member 13 and a material of the second elastic member 14 may be different from each other.

Figure 2:
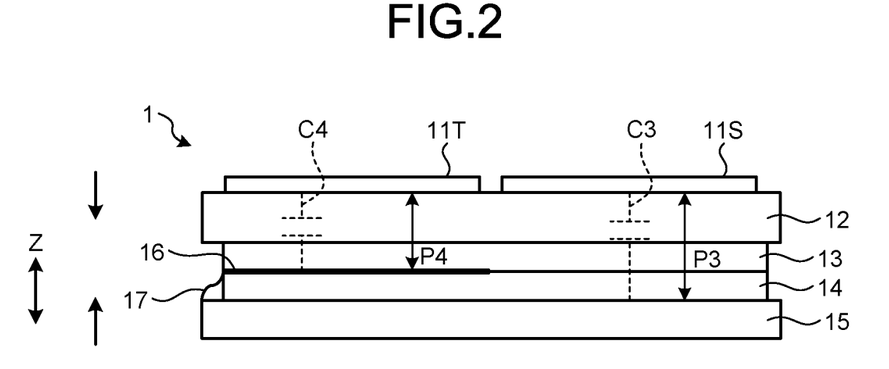
FIG. 2 is a diagram illustrating an example of a state in which the force sensor illustrated in FIG. 1 is compressed in a Z direction.

FIG. 2 is a diagram illustrating an example of a state in which the force sensor 1 illustrated in FIG. 1 is compressed in the Z direction at the first temperature. FIG. 2 illustrates the example in which the force sensor 1 receives force acting to compress it in the Z direction under the condition of the above-mentioned first temperature. The first elastic member 13 and the second elastic member 14 illustrated in FIG. 2 are compressed so as to reduce the thicknesses thereof in the Z direction in comparison with the state illustrated in FIG. 1. A distance P3 between the first electrode 11S and the first conductor 15 in the Z direction in FIG. 2 is therefore less than the distance P1. A distance P4 between the second electrode 11T and the second conductor 16 in the Z direction is less than the distance P2.

Capacitance C3 between the first electrode 11S and the first conductor 15 in FIG. 2 depends on the distance P3. The distance P3 is less than the distance P1, so that the capacitance C3 and the capacitance C1 have different magnitudes. Capacitance C4 between the second electrode 11T and the second conductor 16 in FIG. 2 depends on the distance P4. The distance P4 is less than the distance P2, so that the capacitance C4 and the capacitance C2 have different magnitudes. As described above, when the force sensor 1 receives force acting to compress it in the Z direction under the condition of the first temperature, both of the capacitance that can be detected through the first electrode 11S and the capacitance that can be detected through the second electrode 11T vary while following the force.

Figure 3:
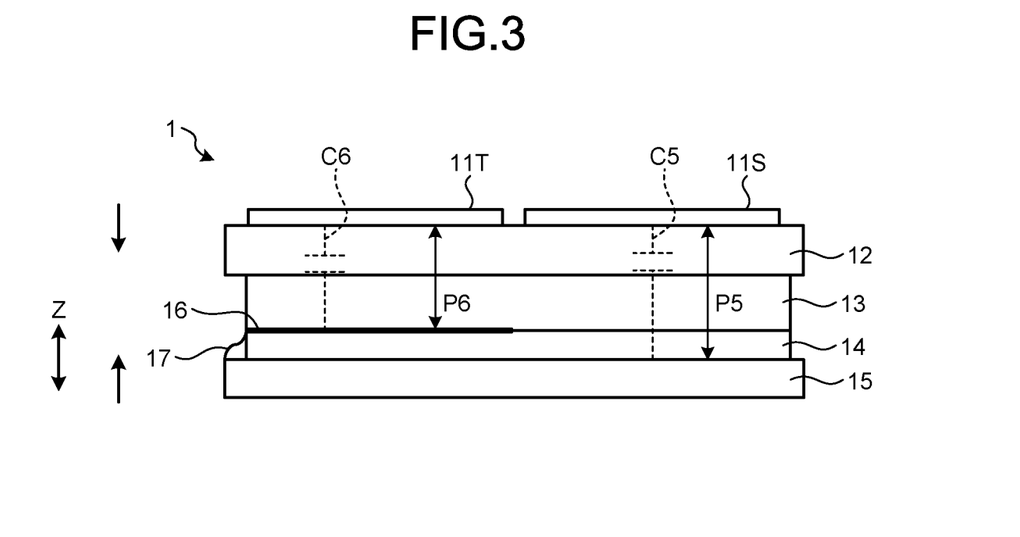
FIG. 3 is a diagram illustrating an example of the state in which the force sensor illustrated in FIG. 1 is compressed in the Z direction, the example being different from that in FIG. 2.

FIG. 3 illustrates an example of a state in which the force sensor 1 illustrated in FIG. 1 is compressed in the Z direction at the second temperature. The force sensor 1 receives force acting to compress it in the Z direction under the condition of the above-mentioned second temperature in the example illustrated in FIG. 3. The second elastic member 14 illustrated in FIG. 3 is compressed so as to reduce the thickness thereof in the Z direction in comparison with the state illustrated in FIG. 1. On the other hand, the first elastic member 13 illustrated in FIG. 3 is hardly compressed from the state illustrated in FIG. 1. Thus, a distance P5 between the first electrode 11S and the first conductor 15 in the Z direction in FIG. 2 is less than the distance P1 but is greater than the distance P3. A distance P6 between the second electrode 11T and the second conductor 16 in the Z direction is substantially the same as the distance P2.

Capacitance C5 between the first electrode 11S and the first conductor 15 in FIG. 3 depends on the distance P5. Capacitance C6 between the second electrode 11T and the second conductor 16 in FIG. 3 depends on the distance P6. The distance P6 is substantially the same as the distance P2, so that the capacitance C6 is also substantially the same as the capacitance C2. Thus, the followability of the variation in the capacitance between the second electrode 11T and the second conductor 16 to the force acting to compress the force sensor 1 in the Z direction is lowered under the condition of the second temperature more significantly than that under the condition of the first temperature. On the other hand, the distance P5 is less than the distance P1. The capacitance C5 and the capacitance C1 therefore have different magnitudes. Thus, the followability of the variation in the capacitance between the first electrode 11S and the first conductor 15 to the force acting to compress the force sensor 1 in the Z direction is less influenced by the temperature, as described above.

Based on the description with reference to FIG. 2 and FIG. 3, The temperatures of the first elastic member 13 and the second elastic member 14 can be determined from the relation between the capacitance that can be detected through the first electrode 11S and the capacitance that can be detected through the second electrode 11T. To be specific, predetermined force acting to compress the force sensor 1 in the Z direction is applied thereto under the condition that the temperatures of the first elastic member 13 and the second elastic member 14 stand at a predetermined temperature, and the capacitance that can be detected through the first electrode 11S and the capacitance that can be detected through the second electrode 11T are measured. Such measurements are acquired for a plurality of patterns with different combinations of the temperatures of the first elastic member 13 and the second elastic member 14 and the force to compress the force sensor 1 in the Z direction to form date indicating a relation among the patterns (see FIG. 5). A circuit 54 in a force detection circuit 50 holds the data as reference data 53. The circuit 54 is a storage circuit such as a memory. The temperatures of the first elastic member 13 and the second elastic member 14 and the force applied to the force sensor 1 in the Z direction can thereby be obtained from the relation between the capacitance that can be detected through the first electrode 11S and the capacitance that can be detected through the second electrode 11T based on the data.

Figure 4:
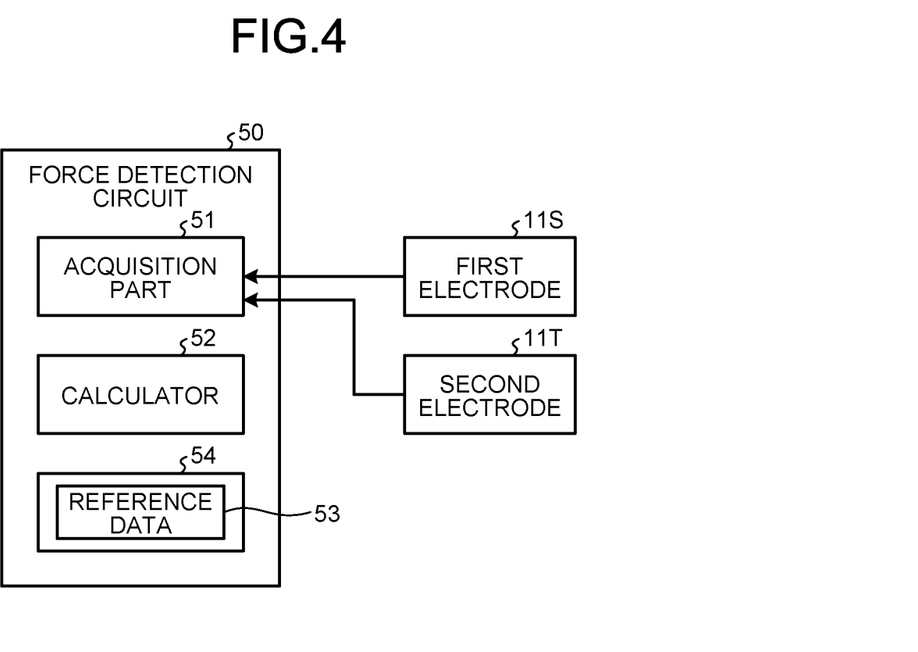
FIG. 4 is a block diagram illustrating an example of the configuration of a force detection circuit.

FIG. 4 is a block diagram illustrating an example of the configuration of the force detection circuit 50. The force detection circuit 50 detects the force applied to the force sensor 1 in the Z direction, based on the capacitance that can be detected through the first electrode 11S and the capacitance that can be detected through the second electrode 11T. The capacitance that can be detected through the first electrode 11S is the capacitance between the first electrode 11S and the first conductor 15. The capacitance that can be detected through the second electrode 11T is the capacitance between the second electrode 11T and the second conductor 16.

The force detection circuit 50 includes an acquisition part 51 and a calculator 52. The force detection circuit 50 includes the circuit 54 holding the reference data 53. The acquisition part 51 is coupled to the first electrode 11S and the second electrode 11T. The acquisition part 51 detects the capacitance through the first electrode 11S. The acquisition part 51 detects the capacitance through the second electrode 11T. The acquisition part 51 digitizes the detected capacitances and outputs the digital data to the calculator 52. For example, an analog-digital conversion circuit (not illustrated) included in the acquisition part 51 forms the digital data.

The calculator 52 derives the force applied to the force sensor 1 in the Z direction based on the data output from the acquisition part 51 and the reference data 53. The calculator 52 determines a ratio between the capacitance detected through the first electrode 11S and the capacitance detected through the second electrode 11T from the data output from the acquisition part 51. The calculator 52 determines the temperature of the first elastic member 13 and the temperature of the second elastic member 14 corresponding to the determined ratio. The calculator 52 derives the force corresponding to the determined temperature of the first elastic member 13 and the determined temperature of the second elastic member 14.

Figure 5:
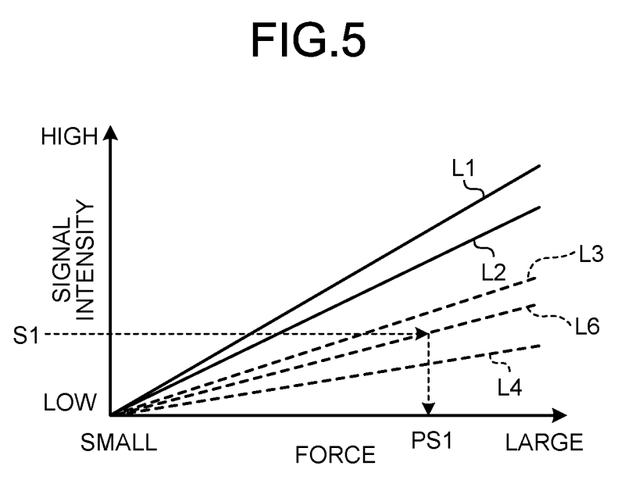
FIG. 5 is a graph illustrating an example of data in which a relation between strength of force applied to the force sensor in the Z direction and signal intensity generated by capacitance varies depending on the temperature of a first elastic member and the temperature of a second elastic member.

FIG. 5 is a graph illustrating an example of data in which a relation between the force applied to the force sensor 1 in the Z direction and signal intensity generated by the capacitance varies depending on the temperature of the first elastic member 13 and the temperature of the second elastic member 14. Line L1 indicates a relation between the force applied to the force sensor 1 in the Z direction and the signal intensity generated by the capacitance detected through the second electrode 11T under the condition of the first temperature. Line L2 indicates a relation between the force applied to the force sensor 1 in the Z direction and the signal intensity generated by the capacitance detected through the second electrode 11T at the second temperature. Dashed line L3 indicates a relation between the force applied to the force sensor 1 in the Z direction and the signal intensity generated by the capacitance detected through the first electrode 11S at the first temperature. Dashed line L4 indicates a relation between the force applied to the force sensor 1 in the Z direction and the signal intensity generated by the capacitance detected through the first electrode 11S at the second temperature. Dashed line L6 indicates a relation between the force applied to the force sensor 1 in the Z direction and the signal intensity generated by the capacitance detected through the first electrode 11S at a third temperature between the first temperature and the second temperature.

Difference between the signal intensity indicated by the line L1 and the signal intensity indicated by the line L2 is generated depending on whether the temperature of the first elastic member 13 stand at the first temperature or the second temperature. Difference between the signal intensity indicated by the dashed line L3 and the signal intensity indicated by the dashed line L4 is generated depending on whether the temperature of the first elastic member 13 and the temperature of the second elastic member 14 stand at the first temperature or the second temperature. As described above, the differences between the lines L1 and L2 and between the dashed lines L3 and L4 illustrated in FIG. 5 indicate that the temperature characteristic of the first elastic member 13 and the temperature characteristic of the second elastic member 14 are different from each other.

A ratio between the signal intensity indicated by the line L1 and the signal intensity indicated by the dashed line L3 is a ratio between the signal intensity generated by the capacitance detected through the first electrode 11S and the signal intensity generated by the capacitance detected through the second electrode 11T. A ratio between the signal intensity indicated by the line L2 and the signal intensity indicated by the dashed line L4 is a ratio between the signal intensity generated by the capacitance detected through the first electrode 11S and the signal intensity generated by the capacitance detected through the second electrode 11T.

When the temperature of the first elastic member 13 and the temperature of the second elastic member 14 are the first temperature, the ratio between the signal intensity generated by the capacitance detected through the first electrode 11S and the signal intensity generated by the capacitance detected through the second electrode 11T is a ratio between L1 and L3 (for example, L1/L3). On the other hand, when the temperature of the first elastic member 13 and the temperature of the second elastic member 14 are the second temperature, the ratio between the signal intensity generated by the capacitance detected through the first electrode 11S and the signal intensity generated by the capacitance detected through the second electrode 11T is a ratio between L2 and L4 (for example, L2/L4). Thus, the temperature of the first elastic member 13 and the temperature of the second elastic member 14 can be determined based on the ratio between the signal intensity generated by the capacitance detected through the first electrode 11S and the signal intensity generated by the capacitance detected through the second electrode 11T.

Figure 6:
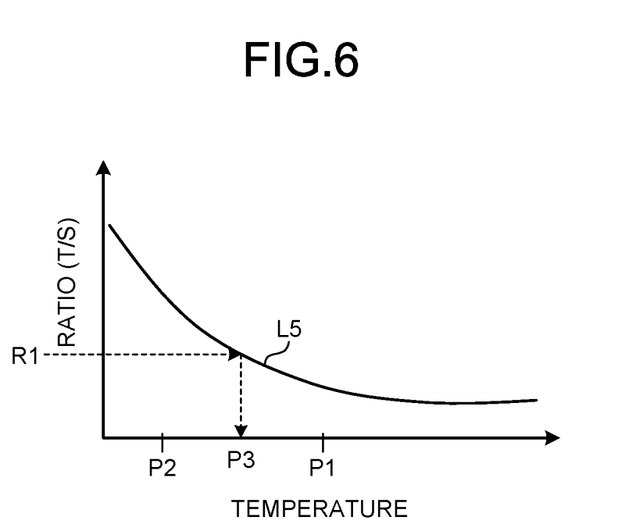
FIG. 6 is a graph illustrating an example of a relation between a ratio between signal intensity generated by capacitance detected through a first electrode and signal intensity generated by capacitance detected through a second electrode, and the temperature of the first elastic member and the temperature of the second elastic member.

FIG. 6 is a graph illustrating an example of a relation between the ratio between the signal intensity generated by capacitance detected through the first electrode 11S and the signal intensity generated by the capacitance detected through the second electrode 11T, and the temperature of the first elastic member 13 and the temperature of the second elastic member 14. The first temperature, the second temperature, and the third temperature are respectively indicated by reference signs P1, P2, and P3 in FIG. 6. As in the above description with reference to FIG. 5 and as is indicated by curve L5 in FIG. 6, the ratio between the signal intensity generated by capacitance detected through the first electrode 11S and the signal intensity generated by the capacitance detected through the second electrode 11T varies depending on the temperature characteristic of the first elastic member 13 and the temperature characteristic of the second elastic member 14. Thus, it is possible for the calculator 52, by including the data corresponding to the graph illustrated in FIG. 5 and the data corresponding to the graph illustrated in FIG. 6 in the reference data 53, to determine the temperatures of the first elastic member 13 and the second elastic member 14 based on the signal intensity generated by the capacitance detected through the first electrode 11S and the signal intensity generated by the capacitance detected through the second electrode 11T.

The calculator 52 can thus determine the temperature of the first elastic member 13 and the temperature of the second elastic member 14. The calculator 52 can therefore derive the force applied to the force sensor 1 in the Z direction based on the data corresponding to the graph illustrated in FIG. 5. When the temperature of the first elastic member 13 and the temperature of the second elastic member 14 stand at the third temperature, for example, a capacitance is detected with which the ratio (T/S) between the signal intensity generated by the capacitance detected through the first electrode 11S and the signal intensity generated by the capacitance detected through the second electrode 11T is R1 as illustrated in FIG. 6. The calculator 52 thereby determines that the temperature of the first elastic member 13 and the temperature of the second elastic member 14 stand at the third temperature (P3). The calculator 52 derives the force based on the relation (dashed line L6) between the force corresponding to the third temperature and the capacitance detected through the first electrode 11S. For example, when a signal having the signal intensity of intensity S1 is provided through the first electrode 11S, the calculator 52 determines that force PS1 in FIG. 5 is applied to the force sensor 1.

Figure 7:
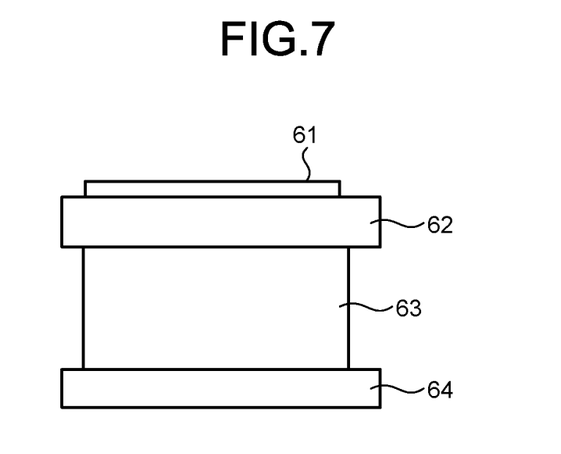
FIG. 7 is a diagram illustrating the configuration of a force sensor according to a comparative example.

FIG. 7 is a diagram illustrating the configuration of a force sensor according to a comparative example. An elastic member 63 of only one type is provided between an insulator 62 on which an electrode 61 is disposed and a conductor 64. Thus, a relation between capacitance that can be detected through the electrode 61 and force applied to the force sensor in the Z direction varies when the elasticity and rigidity of the elastic member 63 are changed with the temperature of the elastic member 63. When the force applied to the force sensor in the Z direction is measured in such a comparative example, a temperature sensor for acquiring the temperature of the force sensor, or the like needs to be separately prepared. By contrast, the first embodiment enables the force applied to the force sensor 1 in the Z direction to be derived without separately preparing the temperature sensor or the like.

As described above, according to the first embodiment, the force sensor 1 includes the first electrode 11S, the second electrode 11T, the first conductor 15, the second conductor 16, and the elastic members. The first conductor 15 faces the first electrode 11S in the Z direction. The second conductor 16 faces the second electrode 11T in the Z direction. The first elastic member 13 and the second elastic member 14 are arranged between the first electrode 11S and the first conductor 15. The first elastic member 13 is arranged between the second electrode 11T and the second conductor 16. The degrees of compression of the first elastic member 13 and the second elastic member 14 with respect to the force thereon are different depending on temperature.

Thus, the temperatures of the first elastic member 13 and the second elastic member 14 can be determined based on the ratio between the capacitance between the first electrode 11S and the first conductor 15, which are arranged with the first elastic member 13 and the second elastic member 14 interposed therebetween, and the capacitance between the second electrode 11T and the second conductor 16, which are arranged with the first elastic member 13 interposed therebetween. The first elastic member 13 and the second elastic member 14 have degrees of compression with respect to force thereon that are different depending on temperature. The temperature of the force sensor 1 can therefore be determined without separately providing the temperature sensor. Thus, the force in the Z direction can be detected with higher accuracy based on the temperature and the capacitance between the first electrode 11S and the first conductor 15 (or the capacitance between the second electrode 11T and the second conductor 16).

The force detection circuit 50 is provided that detects the force applied in the Z direction based on the capacitance between the first electrode 11S and the first conductor 15 and the capacitance between the second electrode 11T and the second conductor 16. Thus, the force in the Z direction can be detected without requiring an external configuration for performing information processing based on the capacitances.

The second conductor 16 is provided between the first elastic member 13 and the second elastic member 14. The first elastic member 13 and the second elastic member 14 can therefore be arranged between the component (for example, the insulator 12) on which the first electrode 11S and the second electrode 11T are arranged, and the first conductor 15. That is to say, the whole of the first elastic member 13 and the second elastic member 14 disposed between the insulator 12 and the first conductor 15 can receive the force applied to the force sensor 1 in the Z direction more easily. The temperature and force that determine the capacitance between the first electrode 11S and the first conductor 15 and the temperature and force that determine the capacitance between the second electrode 11T and the second conductor 16 can be made equal to each other more easily. The force in the Z direction can thereby be detected with higher accuracy.

Modifications

Hereinafter, modifications of the first embodiment will be described with reference to FIG. 8 and FIG. 9. The same reference signs denote the same components as those in the first embodiment, and duplicate explanation thereof is omitted.

First Modification

Figure 8:
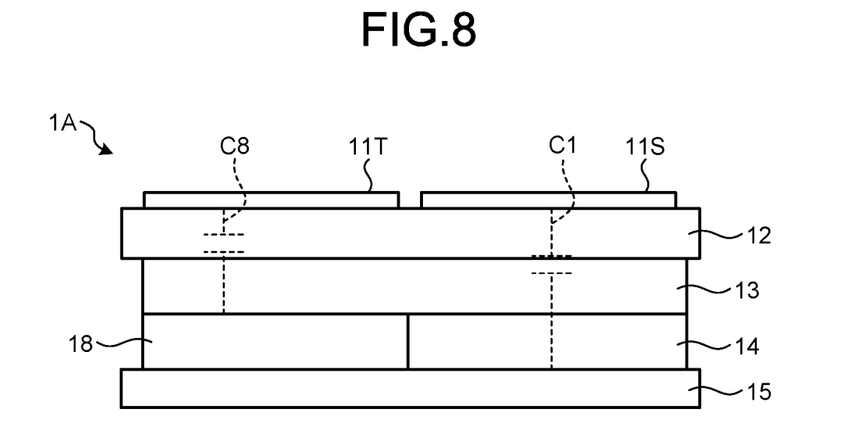
FIG. 8 is a diagram illustrating the main configuration of a force sensor according to a first modification.

FIG. 8 is a diagram illustrating the main configuration of a force sensor 1A according to a first modification. The second elastic member 14 in the modification is provided at a position facing the first electrode 11S in the Z direction. The second elastic member 14 in the modification does not face the second electrode 11T in the Z direction.

The force sensor 1A does not include the second conductor 16 and the coupling line 17. The force sensor 1A includes a conductive elastic member 18 functioning as a second conductor in the modification instead of the second conductor 16 and the coupling line 17. The conductive elastic member 18 is formed of conductive rubber, for example. The conductive elastic member 18 is provided between the first elastic member 13 and the first conductor 15 at a position facing the second electrode 11T in the Z direction. Capacitance C8 between the second electrode 11T and the conductive elastic member 18 is different from the capacitance C1 because the conductive elastic member 18 is a conductor. Thus, force applied to the force sensor 1A in the Z direction can be derived also in the first modification with a mechanism similar to that in the first embodiment.

Second Modification

Figure 9:
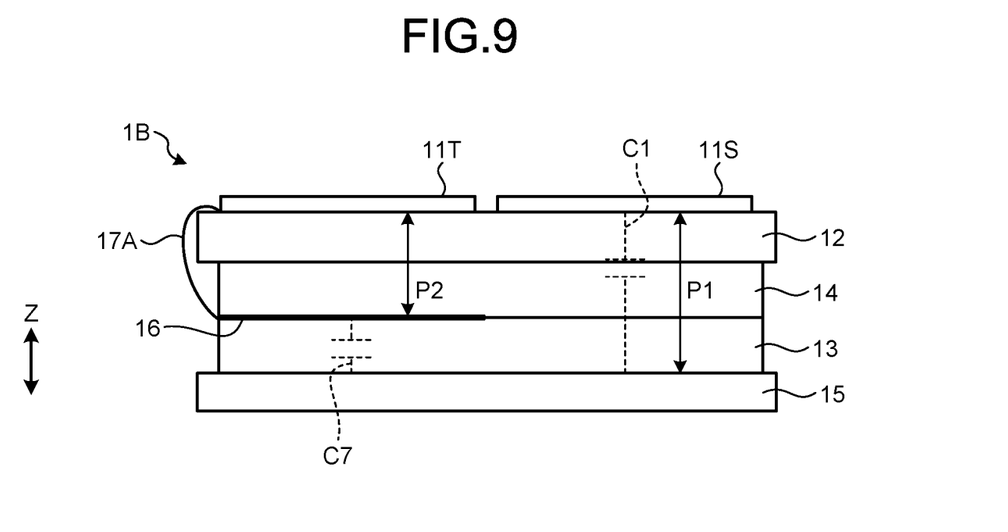
FIG. 9 is a diagram illustrating the main configuration of a force sensor according to a second modification.

FIG. 9 is a diagram illustrating the main configuration of a force sensor 1B according to a second modification. A positional relation between the first elastic member 13 and the second elastic member 14 in the force sensor 1 described with reference to FIG. 1 is reversed in the force sensor 1B. The second electrode 11T and the second conductor 16 are coupled by a coupling line 17A in the force sensor 1B. The force sensor 1B does not include the coupling line 17 coupling the first conductor 15 and the second conductor 16 in the force sensor 1. Capacitance C7 that can be detected through the second electrode 11T in the second modification is capacitance between the first conductor 15 and the second conductor 16. The second modification is similar to the first embodiment described with reference to FIG. 1 and other figures except for the matters specially mentioned hereinbefore. Force applied to the force sensor 1B in the Z direction can be derived also in the second modification with a mechanism similar to that in the first embodiment.

Second Embodiment

Figure 10:
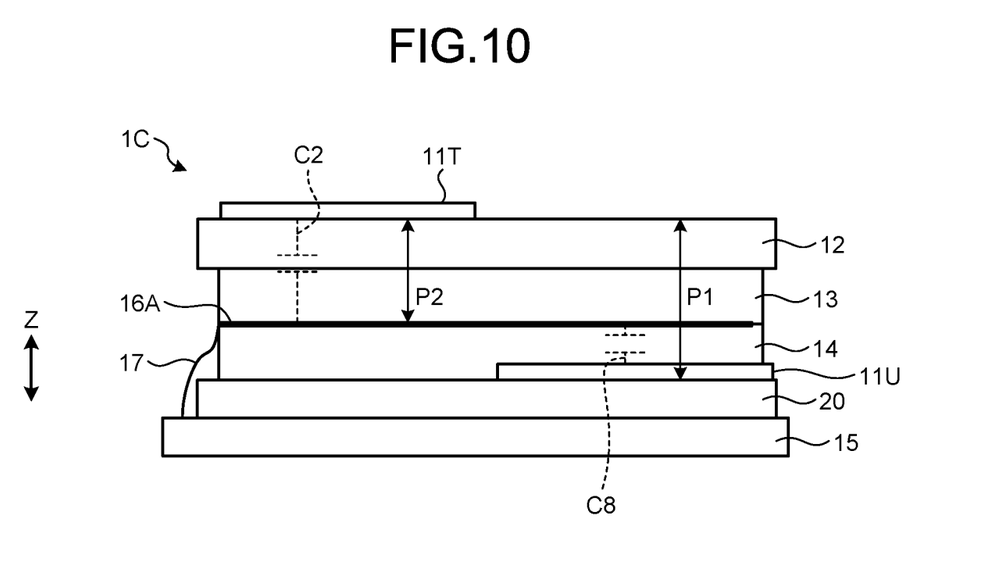
FIG. 10 is a diagram illustrating the main configuration of a force sensor according to a second embodiment.

FIG. 10 is a diagram illustrating the main configuration of a force sensor 1C according to a second embodiment. In explanation of the force sensor 1C in the second embodiment, the same reference signs denote the same components as those in the force sensor 1 in the first embodiment, and duplicate explanation thereof is omitted.

In the second embodiment, a first electrode 11U is provided instead of the first electrode 11S in the first embodiment. The first electrode 11U is provided between the second elastic member 14 and an insulator 20 as illustrated in FIG. 10. The insulator 20 is stacked between the second elastic member 14 and the first conductor 15. The first conductor 15 can be omitted in the second embodiment.

The component provided as the second conductor 16 in the first embodiment is replaced by a conductor 16A in the second embodiment. The conductor 16A is different from the second conductor 16 in the point that it further faces the first electrode 11U in addition to the second electrode 11T. A positional relation of the first elastic member 13, the second elastic member 14, and the conductor 16A in the stacking direction (Z direction) is similar to the positional relation of the first elastic member 13, the second elastic member 14, and the second conductor 16 in the stacking direction (Z direction).

The capacitance C8 can be detected instead of the capacitance C1 in the second embodiment. That is to say, the force sensor 1C is provided capable of detecting the degree of compression of the first elastic member 13 with respect to force thereon based on variation in the capacitance C2 and detecting the degree of compression of the second elastic member 14 with respect to the force thereon based on variation in the capacitance C8.

As described above, the force sensor 1C in the second embodiment includes the first electrode 11O, the second electrode 11T, the conductor 16A facing the first electrode 11U and the second electrode 11T in the first direction (Z direction), the first elastic member 13 arranged between the second electrode 11T and the conductor 16A, and the second elastic member 14 arranged between the first electrode 11U and the conductor 16A. The first elastic member 13 and the second elastic member 14 have the degrees of compression with respect to the force thereon that are different depending on temperature, and are stacked in the first direction (Z direction) with the conductor 16A interposed therebetween.

According to the second embodiment, the force applied to the force sensor 1C in the Z direction can be derived in the same manner as the first embodiment.

Application Example

Hereinafter, an example of a display device 100 to which the force sensors in any one of the embodiments and modifications thereof are applied, will be described with reference to FIG. 11 and FIG. 12.

Figure 11:
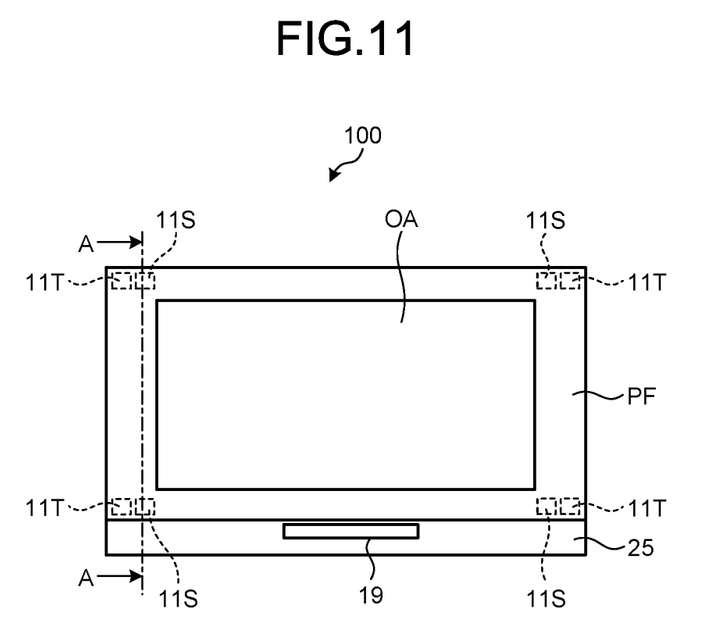
FIG. 11 is a plan view illustrating an example of the main configuration of a display device according to an application example.
Figure 12:
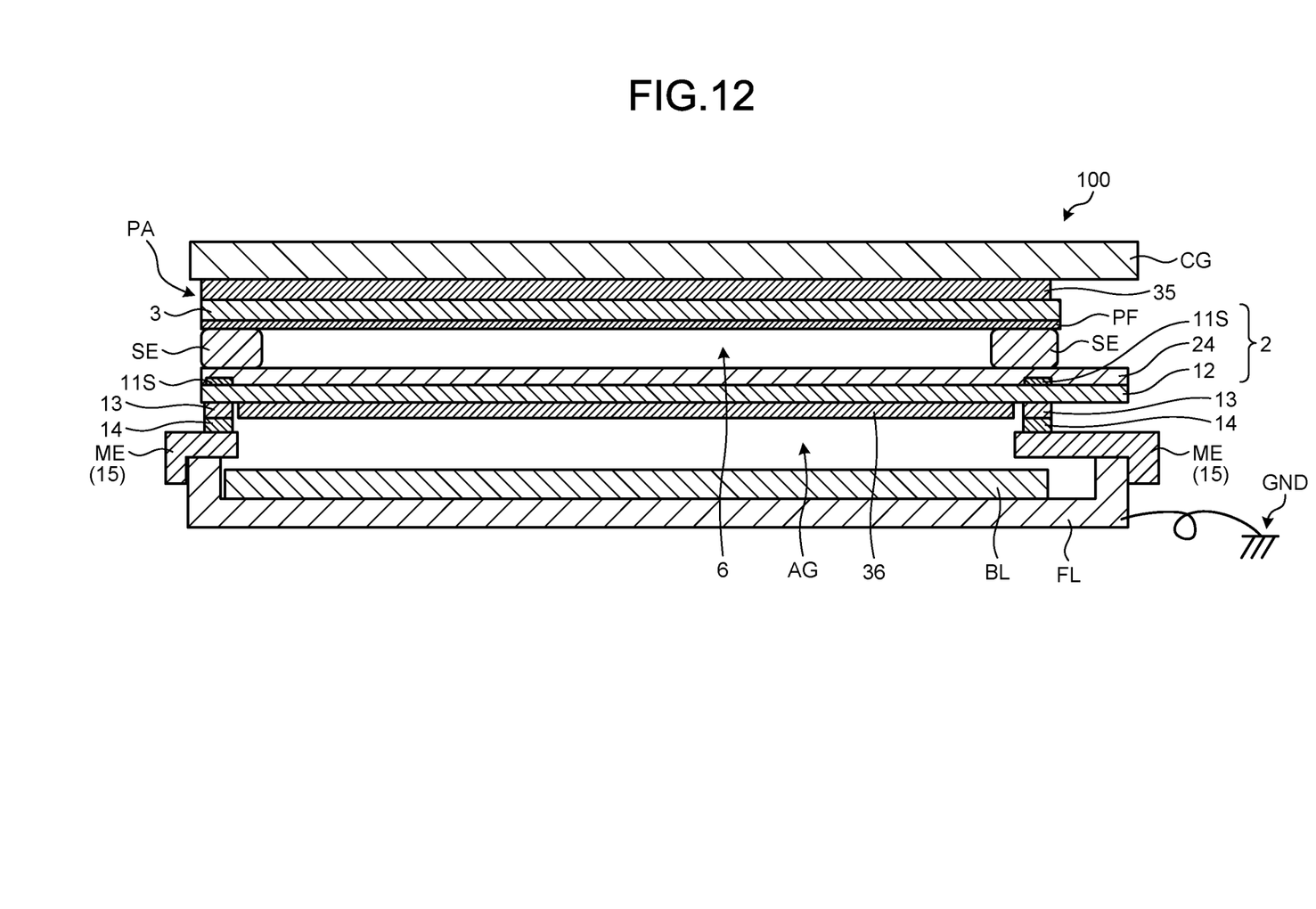
FIG. 12 is a cross-sectional view cut along line A-A in FIG. 11.

FIG. 11 is a plan view illustrating an example of the main configuration of the display device 100 according to an application example. FIG. 12 is a cross-sectional view cut along line A-A in FIG. 11. The display device 100 displays an image in a display region OA. A frame region PF in which no image is displayed is provided around the display region OA. A plurality of pixels are provided in the display region OA. Each pixel includes a switching element including a thin film transistor (TFT) or the like. The switching element is coupled to a scan line and a signal line. The scan line is coupled to the gate of the switching element, and the signal line is coupled to one of the source and the drain of the switching element. The switching element is driven in response to a scan signal output from a gate driver and transmitted through the scan line. Each pixel operates so as to perform display output with luminance corresponding to a pixel signal output from a source driver and transmitted through the signal line. When the display device 100 is a liquid crystal display device, a voltage corresponding to the pixel signal acts on liquid crystal sealed between a pixel electrode coupled to the other of the source and the drain and a common electrode facing the pixel electrode to change the orientation of liquid crystal molecules, thereby performing luminance control of each pixel. When the display device 100 is a display device using organic light emitting diodes (OLEDs), an organic light emitting layer emits light with luminance corresponding to the pixel signal by application of a voltage to the organic light emitting layer from a pixel electrode coupled to the other of the source and the drain. The first electrode 11S and the second electrode 11T are arranged in the frame region PF in a plan view orthogonally to the Z direction.

The display device 100 includes a display panel PA. The display panel PA includes a first substrate 2 and a second substrate 3. A polarizing plate 35 is mounted on the display surface side of the display panel PA. A polarizing plate 36 is mounted on the rear surface side of the display panel PA. Backlight BL is disposed on the rear surface side of the polarizing plate 36. An air gap AG is provided between the polarizing plate 36 and the backlight BL. The backlight BL is disposed in a first housing FL. The first housing FL is a box-like conductor the display panel PA side of which is opened. The first housing FL is mounted on the rear surface side of the display panel PA, and the first elastic member 13, the second elastic member 14, and a second housing ME are interposed therebetween. The second housing ME is a frame body having a rectangular shape when seen from above. The first housing FL is grounded and has a ground potential GND. The second housing ME is a conductor abutting on the first housing FL and functions as the first conductor 15.

The display panel PA is illuminated by the backlight BL from the rear surface side. The display panel PA in the application example that is described with reference to FIG. 11 and FIG. 12 functions as what is called a liquid crystal display device changing display contents by controlling the orientation of the liquid crystal contained in a liquid crystal layer 6 sealed between the first substrate 2 and the second substrate 3. A cover glass CG is arranged on the display surface side of the polarizing plate 35. An exposed surface of the cover glass CG functions as the display surface in the application example. It is sufficient that the display device 100 has the frame region PF. The display device 100 may be a reflective or transflective liquid crystal display device, a self-luminous display device like the display device using the OLEDs as described above, or a display device employing another system. When the self-luminous display device or a display device using external light (for example, the reflective liquid crystal display device) is employed, a light source such as the backlight BL can be omitted.

The liquid crystal layer 6 is interposed between the first substrate 2 and the second substrate 3, and the lateral sides thereof are closed by a seal member SE, so that the liquid crystal layer 6 is sealed in the display panel PA. A light shielding layer forming the frame region PF is arranged between the second substrate 3 and the seal member SE.

The first substrate 2 includes the insulator 12, and the first electrodes 11S, the second electrodes 11T, and an insulating layer 24 stacked on the insulator 12. As illustrated in FIG. 12, the insulator 12, the first elastic members 13, the second elastic members 14, and the first conductors 15 are arranged at positions corresponding to the first electrodes 11S in the Z direction. Although the second electrodes 11T are not illustrated in FIG. 12, the second electrodes 11T are provided in the same layer as the first electrodes 11S. The insulator 12, the first elastic members 13, and the first conductor 15 are arranged also at positions corresponding to the second electrodes 11T in the Z direction. The second elastic members 14, the second conductors 16, and the coupling lines 17 are arranged at positions corresponding to the second electrodes 11T in the Z direction. The conductive elastic members 18 may be provided instead of the second elastic members 14, the second conductors 16, and the coupling lines 17. In order to provide spaces for the coupling lines 17 that are coupled to the second electrodes 11T to be used for deriving force after the temperature determination in the application example, the second electrodes 11T are desirably arranged outside the first electrodes 11S in the frame region PF.

A flexible printed circuit (FPC) 25 is provided to the first substrate 2. A chip on glass (COG) 19 is provided on the FPC 25. The COG 19 controls operations of the display panel PA and the backlight BL. The FPC 25 transmits, to the COG 19, signals input from an external control circuit. The signals are various signals related to the operations of the display panel PA and the backlight BL.

According to the application example, the display device 100 includes the force sensors according to any one of the embodiments and the modifications thereof and the display panel PA displaying an image. Thus, the force applied to the display device 100 in the Z direction can be detected. An inclination state of the display device 100 in the Z direction can be detected based on the difference between detection results of one or some of the force sensors and detection results of the other or the others of the force sensors.

The first electrodes 11S and the second electrodes 11T are provided in the frame region PF of the display panel PA. The first conductor 15 is a housing (second housing ME) arranged so as to face the display panel PA in the Z direction on the opposite side to the display surface of the display panel PA on which an image is displayed. The first elastic members 13 and the second elastic members 14 are provided between the display panel PA and the second housing ME.

Thus, the force applied to the display panel PA supported on the housing from the rear surface side in the Z direction can be detected.

The first electrodes 11S and the second electrodes 11T are formed in the same layer as display components (for example, the pixel electrodes) stacked on the insulator 12, thereby further simplifying a manufacturing process for providing the first electrodes 11S and the second electrodes 11T.

Other operations and effects provided by the aspects described in the embodiments, modifications, and application example that are obvious from description of the present specification or at which those skilled in the art can appropriately achieve, should be interpreted to be provided by the present disclosure.

The present disclosure includes the following aspects.

(1) A force sensor comprising a first electrode, a second electrode, a first conductor facing the first electrode in a first direction, a second conductor facing the second electrode in the first direction, a first elastic member and a second elastic member arranged between the first electrode and the first conductor, and the first elastic member arranged between the second electrode and the second conductor, in which the first elastic member and the second elastic member have degrees of compression with respect to force thereon that are different depending on temperature.

(2) The force sensor according to (1), further comprising a detection circuit configured to detect force applied in the first direction based on capacitance between the first electrode and the first conductor and capacitance between the second electrode and the second conductor.

(3) The force sensor according to (1) or (2), in which the first conductor and the second conductor are electrically coupled to each other.

(4) The force sensor according to any one of (1) to (3), in which the second conductor is formed of conductive rubber.

(5) The force sensor according to any one of (1) to (4), in which the first elastic member and the second elastic member are formed of porous synthetic rubber, and the first elastic member and the second elastic member are different in at least one of size, number, and distribution of pores.

(6) The force sensor according to any one of (1) to (4), in which a material of the first elastic member and a material of the second elastic member are different from each other.

(7) A force sensor comprising a first electrode, a second electrode, a conductor facing the first electrode and the second electrode in a first direction, a first elastic member arranged between the second electrode and the conductor, and a second elastic member arranged between the first electrode and the conductor, in which the first elastic member and the second elastic member have degrees of compression with respect to force thereon that are different depending on temperature, and the first elastic member and the second elastic member are stacked in the first direction with the conductor interposed therebetween.

(8) A display device comprising the force sensor according to any one of (1) to (7), and a display panel configured to display an image.

(9) The display device according to (8), in which the first electrode and the second electrode are provided in a frame region around a display region of the display panel in which the image is displayed, the first conductor is a housing arranged so as to face the display panel on an opposite side to a display surface of the display panel on which the image is displayed, and the first elastic member and the second elastic member are provided between the display panel and the housing.

What is claimed is:

1. A force sensor comprising:
a first electrode;
a second electrode;
a first conductor facing the first electrode in a first direction;
a second conductor facing the second electrode in the first direction;
a first elastic member and a second elastic member arranged between the first electrode and the first conductor; and
the first elastic member arranged between the second electrode and the second conductor, wherein
the first elastic member and the second elastic member have degrees of compression with respect to force thereon that are different depending on temperature,
the first electrode and the second electrode do not overlap each other when viewed in the first direction,
in a position facing the first electrode, the first elastic member and the second elastic member are in direct contact with each other, and
the second conductor faces the second electrode and does not face the first electrode.

2. The force sensor according to claim 1, further comprising a detection circuit configured to detect force applied in the first direction based on capacitance between the first electrode and the first conductor and capacitance between the second electrode and the second conductor.

3. The force sensor according to claim 1, wherein the first conductor and the second conductor are electrically coupled to each other.

4. The force sensor according to claim 1, wherein the second conductor is formed of conductive rubber.

5. The force sensor according to claim 1, wherein
the first elastic member and the second elastic member are formed of porous synthetic rubber, and
the first elastic member and the second elastic member are different in at least one of size, number, and distribution of pores.

6. The force sensor according to claim 1, wherein a material of the first elastic member and a material of the second elastic member are different from each other.

7. A display device comprising:
the force sensor according to claim 1; and
a display panel configured to display an image.

8. The display device according to claim 7, wherein
the first electrode and the second electrode are provided in a frame region around a display region of the display panel in which the image is displayed,
the first conductor is a housing arranged so as to face the display panel on an opposite side to a display surface of the display panel on which the image is displayed, and
the first elastic member and the second elastic member are provided between the display panel and the housing.

9. A force sensor comprising:
a first electrode;
a second electrode;
a conductor facing the first electrode and the second electrode in a first direction;
a first elastic member arranged between the second electrode and the conductor; and
a second elastic member arranged between the first electrode and the conductor, wherein
the first elastic member and the second elastic member have degrees of compression with respect to force thereon that are different depending on temperature, the first elastic member and the second elastic member are stacked in the first direction with the conductor interposed between the first elastic member and the second elastic member, the first electrode and the second electrode do not overlap each other when viewed in the first direction, and in a position facing the second electrode, no electrodes and no conductors are provided in the same layer as that of the first electrode.

10. A display device comprising:

the force sensor according to claim 9; and a display panel configured to display an image.

11. The display device according to claim 10, wherein the first electrode and the second electrode are provided in a frame region around a display region of the display panel in which the image is displayed, a first conductor is a housing arranged so as to face the display panel on an opposite side to a display surface of the display panel on which the image is displayed, and the first elastic member and the second elastic member are provided between the display panel and the housing.

\* \* \* \* \*